W. S. KELLEY.
DYNAMO ELECTRIC MACHINE.
APPLICATION FILED FEB. 10, 1908.

931,620.

Patented Aug. 17, 1909.

Witnesses:
Jas. J. Maloney.

Inventor:
Walter S. Kelley,
by J. Paul H. Livermore
Attys.

UNITED STATES PATENT OFFICE.

WALTER S. KELLEY, OF BROOKLINE, MASSACHUSETTS.

DYNAMO-ELECTRIC MACHINE.

No. 931,620.  Specification of Letters Patent.  Patented Aug. 17, 1909.

Application filed February 10, 1908. Serial No. 415,208.

*To all whom it may concern:*

Be it known that I, WALTER S. KELLEY, a citizen of the United States, residing at Brookline, in the county of Norfolk and State of Massachusetts, have invented an Improvement in Dynamo-Electric Machines, of which the following description, in connection with the accompanying drawings, is a specification, like letters on the drawings representing like parts.

The present invention relates to a dynamo electric machine, and is shown as embodied in a motor of the induction type, although the invention may be applied to any laminated structure for dynamo-electric machinery.

The invention is mainly embodied in the construction of the armature and field members, and the fastening devices which hold the said members in place.

Figure 1:
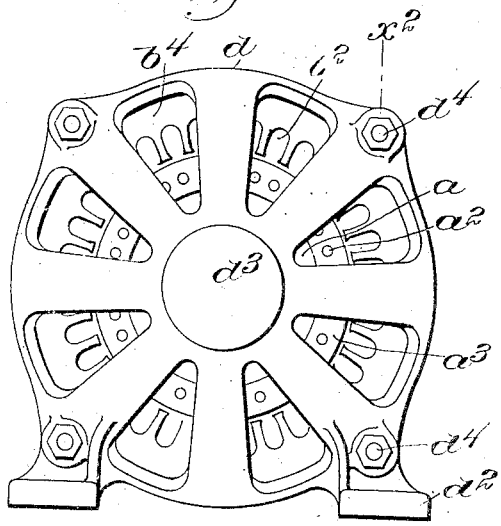
Figure 2:
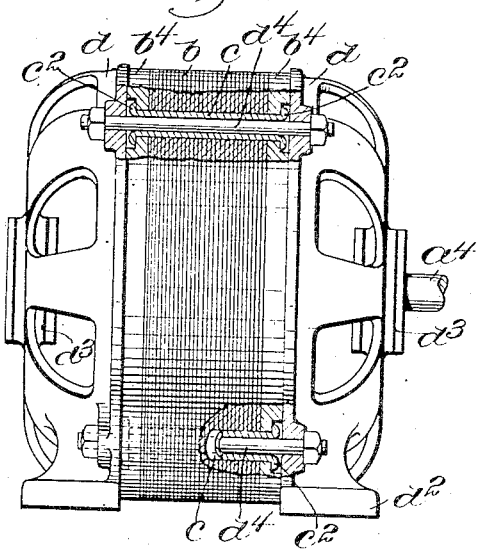
Figure 3:
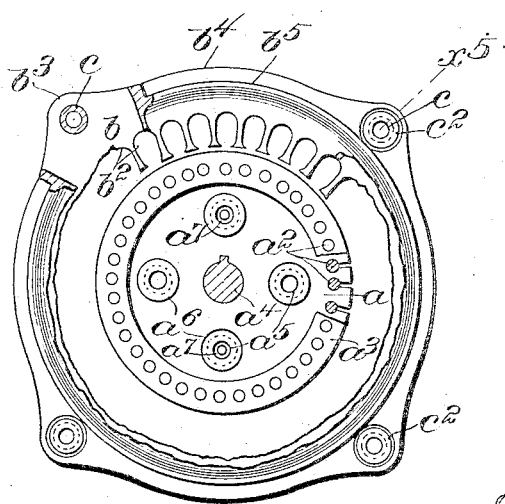
Figure 4:
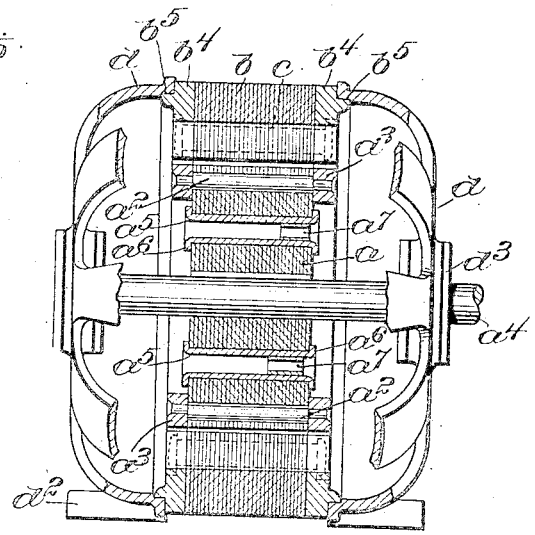
Figure 5:
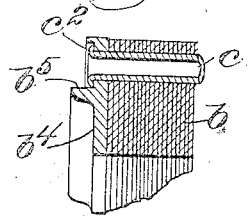

For the purpose of illustrating and describing the invention, a motor of the so-called "squirrel cage" type has been chosen, and in the construction shown, the armature laminæ are arranged to be mounted directly upon the armature shaft, being punched with alined central openings of the right size to fit over the shaft and to be held thereon by means of a key or feather. The laminæ punched in this way are held together by means of tubular fastening devices or rivets which are passed through openings symmetrically arranged in the laminæ and provided with shoulders at their outer ends to clamp all the laminæ together. The field laminæ are similarly connected, being preferably provided with alined ears or lugs which project beyond the normal section of the magnetic field, there being two annular members at opposite sides of the field provided with corresponding lugs, the said annular members and the laminæ being clamped together by means of tubular rivets similar to those described in connection with the armature. The two annular members are provided with shoulders adapted to receive the end members of the motor frame which contain the armature bearings, and by the construction above described these annular shoulders can be machined after the field laminæ are clamped in place, the frame members then being secured to the field by means of bolts which pass through the tubular rivets.
Figure 1 is an end elevation of a machine embodying the invention; Fig. 2 is a side elevation, parts being broken out and shown in section on the plane indicated by the line $x^2$ of Fig. 1; Fig. 3 is an end view, partly in section, of the field member and armature, with the motor frame omitted; Fig. 4 is a vertical, longitudinal section of the machine, with part of the frame shown in elevation; and Fig. 5 is a sectional detail taken on the line $x^5$ of Fig. 3.

The armature $a$ consists of laminæ properly notched to receive the cross conductors $a^2$ which are supported at opposite ends in annular rings $a^3$, as is customary in this type of machine. In assembling the armature, the laminæ which are punched with the notches for the cross conductors $a^2$ and with central openings for the armature shaft $a^4$, are held together by means of tubular members $a^5$ which pass through symmetrically arranged openings in the laminæ, the said tubular members being provided at the outer ends with shoulders $a^6$, to hold the laminæ together. The shoulders at the ends of the tubular members may be provided in any suitable way, it being practicable, for example, to upset or spin out the ends of the tubular members themselves, as shown. This construction is inexpensive, and the intermediate supporting member for the laminæ which is commonly connected directly with the shaft may, in some cases, be dispensed with, as shown, the tubular fastening devices, moreover, affording ventilating openings which aid in keeping the machine cool. A further advantage of this construction consists in the means afforded for obtaining a perfect mechanical balance of the armature, without cutting away, or adding to any part thereof where such renewal or addition of metal may injure the structure or disturb the electrical balance. Such mechanical balance may be obtained, as shown in Fig. 4, by inserting additional material, such as pieces of metal $a^7$, in the tubular fastening members. Pieces of iron piping cut to such lengths as have the desired weight, are suitable for this purpose, and do not interfere with the ventilation.

The field laminæ $b$ having the notches $b^2$ to receive the field winding are provided with openings to receive transverse fastening devices indicated as tubular members $c$ similar to the tubular members $a^5$ described in connection with the armature construction. In the construction shown, the openings are formed in ears or extensions $b^3$, which project beyond the normal path of the magnetic flux, but this location of the openings, while desirable, is not essential to the invention. The field laminæ are clamped by means of said members between two annular plates $b^4$ through which the members $c$ extend, being upset or spun over in countersunk recesses, as indicated at $c^2$, to hold the parts all together. The annular rings $b^4$ are provided with shoulders $b^5$ which are arranged to receive and center the end frame members $d$ of the motor, which members are shown as constituting the support for the motor, being provided with standards $d^2$, as well as supporting the bearings $d^3$ for the armature shaft $a^4$. After the field laminæ have been clamped in position between the end members $b^4$, the shoulder $b^5$ may be machined so as to bring all the parts into the proper alinement, and the frame members $d$ are then secured in position by means of bolts $d^4$ which extend through the tubular fastening devices $c$.

As will be seen from the foregoing description, the structure is very strong, and, furthermore, is very inexpensive, in view of the accuracy with which the parts may be put together, it being practicable to use the castings in the rough, for the most part, the only machining or finishing necessary being that of the frame members $d$ and of the shoulders $b^5$ along the surfaces where the said frame members and shoulders come together. Furthermore, a field structure made up, as hereinbefore described, of laminæ clamped in position between the end members $b^4$ by means of the tubular fastening devices $c^5$, is a very convenient form for packing and storage, and for handling when winding the coils in the field slots; as the structure is perfectly symmetrical and without projections to take up space or interfere with handling. Both of these considerations are important from a manufacturing standpoint.

Claims.

1. In a dynamo electric machine, a laminated field; annular clamping members between which the laminæ of said field are clamped; annular shoulders formed on said clamping members; tubular fastening devices extending through said clamping members and the laminæ and expanded at opposite ends; supporting frame members fitted on said shoulders; and bolts extending through openings in said frame members and through said tubular fastening members, whereby the laminæ and the frame members are all clamped together.

2. In a dynamo electric machine, a field consisting of laminæ each provided with ears or extensions projecting beyond the normal path of the magnetic flux; annular clamping plates at opposite ends, said annular plates and said ears being provided with openings; tubular fastening devices extending through said openings and enlarged at the outer ends; frame members at opposite ends of said field to support the same; and bolts extending through said frame members and said tubular fastening devices, said frame members being adapted to support the armature.

3. The combination with the field laminæ; of annular clamping members, said members being provided with annular shoulders and countersunk openings; tubular fastening devices extending through said openings and the laminæ and expanded in the counter sunk portions; frame members fitting over said annular shoulders; bolts extending through said frame members and the tubular fastening devices whereby the field is clamped in the frame; an armature shaft bearing in the frame members; laminæ mounted on said shaft; tubular fastening devices extending through said laminæ and expanded at the ends to clamp them together; and tubular weights inserted in said tubular fastening devices to balance said armature without interfering with the ventilation thereof.

In testimony whereof, I have signed my name to this specification in the presence of two subscribing witnesses.

WALTER S. KELLEY.

Witnesses:
JAS. J. MALONEY,
W. E. COVENEY.